US008417182B2

(12) United States Patent
Shimado

(10) Patent No.: US 8,417,182 B2
(45) Date of Patent: Apr. 9, 2013

(54) EXCESSIVE-SIGNAL PREVENTION APPARATUS AND METHOD THEREFOR

(75) Inventor: Shingo Shimado, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/638,381

(22) PCT Filed: Feb. 18, 2011

(86) PCT No.: PCT/JP2011/053448
§ 371 (c)(1),
(2), (4) Date: Sep. 28, 2012

(87) PCT Pub. No.: WO2011/148680
PCT Pub. Date: Dec. 1, 2011

(65) Prior Publication Data
US 2013/0029594 A1 Jan. 31, 2013

(30) Foreign Application Priority Data
May 26, 2010 (JP) .................................. 2010-120323

(51) Int. Cl.
*H04Q 7/20* (2006.01)
(52) U.S. Cl. ....... 455/26.1; 455/461; 455/462; 455/463; 455/555; 455/422.1; 370/310; 370/328; 370/329; 370/338; 370/343; 379/229; 379/231; 379/234; 379/112.09; 379/1.01
(58) Field of Classification Search ................. 455/26.1, 455/461, 462, 463, 464, 465, 555, 445, 422, 455/403, 550.1, 67.11, 414.1–414.4, 426.1, 455/426.2, 500, 517, 507, 509, 515; 370/310, 370/328, 329, 338, 343; 379/229, 231, 234, 379/112.09, 12, 22, 26.01, 1.01, 8.9, 6
See application file for complete search history.

(56) References Cited

U.S. PATENT DOCUMENTS 5,818,918 A * 10/1998 Fujii ........................ 379/167.01
6,070,081 A *  5/2000 Takahashi et al. ............ 455/463
6,115,459 A     9/2000 Wakabayashi

FOREIGN PATENT DOCUMENTS

| JP | 4-56556 A    | 2/1992  |
|----|--------------|---------|
| JP | 4-336790 A   | 11/1992 |
| JP | 5-308688 A   | 11/1993 |
| JP | 10-224837 A  | 8/1998  |
| JP | 2000-36869 A | 2/2000  |
| JP | 2006-303564 A| 11/2006 |
| JP | 2008-160320 A| 7/2008  |

* cited by examiner

*Primary Examiner* — Keith Ferguson
(74) *Attorney, Agent, or Firm* — Sughrue Mion, PLLC

(57) ABSTRACT

Disclosed is an excessive-signal prevention apparatus which includes a connection state judgment section and a zero-level signal insertion section. The connection state judgment section detects whether connection between a first device and a second device is normal or abnormal on the basis of a pattern of signals that are other than a transmission signal transmitted from the first device to the second device at normal time and are required for transmission of the transmission signal. The zero-level signal insertion section outputs the transmission signal output from the first device to a destination during a period of time when the connection state judgment section judges that the connection between the first and the second device is normal, and which outputs a zero-level signal to the destination during a period of time when the connection state judgment section judges that the connection between the first and the second device is abnormal.

8 Claims, 3 Drawing Sheets

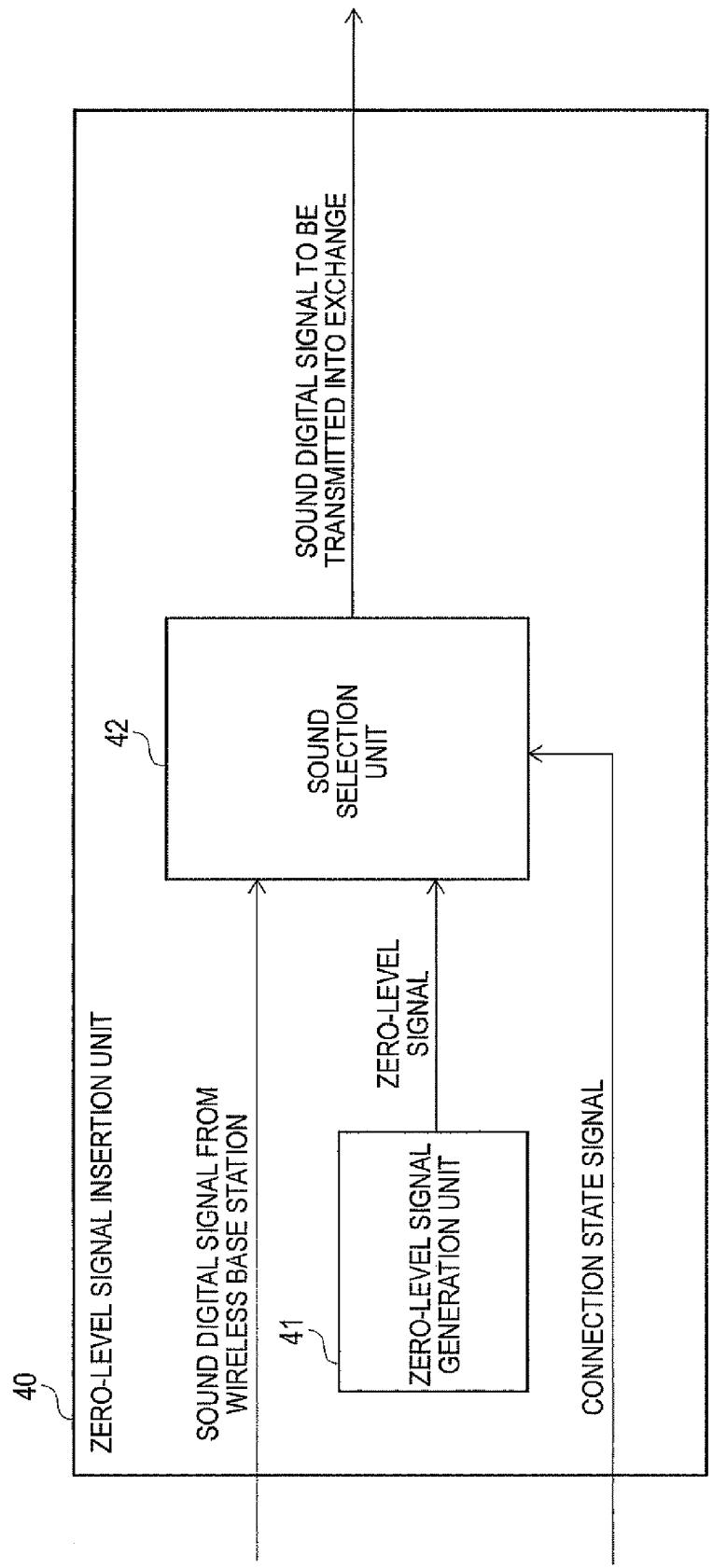

EXCESSIVE-SIGNAL PREVENTION APPARATUS AND METHOD THEREFOR

CROSS REFERENCE TO RELATED APPLICATIONS

This application is a National Stage of International Application No. PCT/JP2011/053448 filed on Feb. 18, 2011, which claims priority from Japanese Patent Application No. 2010-120323, filed on May 26, 2010, the contents of all of which are incorporated herein by reference in their entirety.

TECHNICAL FIELD

The present invention relates to an excessive signal prevention apparatus and an excessive signal prevention method that prevent a transmission signal, which is transmitted from a first device to a second device at normal time, from becoming a transmission signal representing an excessive level (referred to as an "excessive signal," hereinafter) at a time when the connection of the first and second devices turns abnormal.

BACKGROUND ART

An example in which the first device is a wireless base station and the second device is a private branch exchange is used for the following explanation.

A mobile station that is wirelessly connected to the wireless base station converts a sound analog signal, which is obtained from the voice of a user of the mobile station, to a sound digital signal. The sound digital signal remains unchanged when being transmitted from the mobile station to a telephone of an intended person via the wireless base station, the private branch exchange, and the like. The telephone of the intended person reproduces the sound analog signal from the sound digital signal, making it possible for the intended person to listen to the sound.

If noise gets mixed into the sound digital signal on a transmission line of the sound digital signal, the sound analog signal, too, is affected by the noise. In particular, if noise gets mixed into a heavily weighted portion of the sound digital signal, an excessive sound is generated at the telephone of the intended person, making the intended person feel uncomfortable.

One of the reasons why noise gets mixed into the sound digital signal is the disconnection of a line between the wireless base station and the private branch exchange.

Conventionally, as for the detection of the disconnection of a line to which a base station interface card of the private branch exchange and the wireless base station are connected, the following have been used to detect the disconnection and recovery, thereby suppressing the excessive sound: the monitoring of line voltage by hardware, and the monitoring of communication state by software of the private branch exchange. In the case of a conventional hardware-based suppressing means, if the line disconnection and the recovery take place for a short period of time, the excessive sound could be transmitted to the exchange at the time of recovery. In the case of a software-based suppressing means, the detection cycle is long depending on the specifications of the exchange; therefore, until the line disconnection is detected by software, the excessive sound could be transmitted to the exchange.

What is disclosed in PTL 1 is a line disconnection detection method, according to which: in an in-band signal transmission device that uses a transmission line for transmitting and receiving a sound signal and uses a first frequency signal including an in-band single frequency signal or a plurality of frequency signals to transmit and receive a signaling signal for an exchange or telephone, a signal generation means that a transmission unit includes is used to generate a second frequency signal that is different from the sound signal and the first frequency signal; during a talk situation, the second frequency signal is transmitted from the signal generation means to the other station at a time when a non-talk situation is detected by a level detection means in such a way that the sound signal of the other station and the second frequency signal are detected by the level detection means that a receiving unit includes; and it is determined that the line is disconnected at a time when the second frequency signal is not detected by the level detection means. Moreover, the following is disclosed in PTL 1: According to the line disconnection detection method, a no-signal detection means that the transmission unit includes is used to detect a non-signal state of a transmission sound and the first frequency signal; the disconnection of the line at the time of signaling or non-talking is detected by the no-signal state detection of the no-signal detection means; and the disconnection of the line during talking is detected by a no-signal state of the second frequency signal by the level detection means.

CITATION LIST

Patent Literature

{PTL 1} JP-A-Hei-04-56556

SUMMARY OF INVENTION

Technical Problem

Conventionally, as for the state of the line connected to the wireless base station, the disconnection of the line has been detected by monitoring a voltage level of the line. Therefore, the problem is that an excessive sound suppression control circuit becomes large in size because a voltage detection circuit of the line and a silence insertion circuit are needed.

Moreover, if software is used to monitor the communication state between the exchange and the base station and thereby detect the disconnection of the line, it is not possible to detect the line disconnection promptly. Therefore, the problem is that the excessive sound cannot be blocked completely.

Furthermore, if the line has recovered in the situation where a sound connection at the exchange is still maintained, sound data from the wireless base station is immediately transmitted to the exchange. Therefore, the problem is that the excessive sound is generated even at the time of recovery until the sound data becomes stable.

Furthermore, according to the invention disclosed in PTL 1, complicated control needs to be carried out to separately detect the line disconnection at the time of talking and the line disconnection at the time of non-talking. Moreover, a signal other than those for signaling or telephone call, or a second frequency signal, needs to be introduced.

Accordingly, one of the objects of the present invention is to provide an excessive signal prevention apparatus and an excessive signal prevention method which are able to prevent an excessive signal from occurring with a small configuration without the need to use any signal other than the signals required for transmission of transmission signals.

Solution to Problem

According to the first aspect of the present invention, what is provided is an excessive signal prevention apparatus including: a connection state judgment section which detects whether connection between a first device and a second device is normal or abnormal on the basis of a pattern of one or more signals that are other than a transmission signal transmitted from the first device to the second device at normal time and are required for transmission of the transmission signal; and a zero-level signal insertion section which outputs the transmission signal output from the first device to a destination during a period of time when the connection state judgment section judges that the connection between the first device and the second device is normal, and which outputs a zero-level signal to the destination during a period of time when the connection state judgment section judges that the connection between the first device and the second device is abnormal.

Moreover, according to the second aspect of the present invention, what is provided is an excessive signal prevention method including: a connection state judgment step of detecting whether connection between a first device and a second device is normal or abnormal, as well as whether an input sound signal is normal or abnormal, on the basis of a pattern of one or more signals that are other than a transmission signal transmitted from the first device to the second device at normal time and are required for transmission of the transmission signal; and a zero-level signal insertion step of outputting the transmission signal output from the first device to a destination during a period of time when the connection state judgment step judges that the connection between the first device and the second device is normal, and outputting a zero-level signal to the destination during a period of time when the connection state judgment step judges that the connection between the first device and the second device is abnormal.

Advantageous Effects of Invention

According to an exemplary advantage of the present invention, on the basis of the pattern of one or more signals that are other than the transmission signal transmitted from the first device to the second device at normal time and are required for transmission of the transmission signal, whether the connection between the first device and the second device is normal or abnormal is detected. Therefore, it is possible to prevent an excessive signal from occurring with a small configuration without the need to use any signal other than the signals required for transmission of the transmission signals.

BRIEF DESCRIPTION OF DRAWINGS

{FIG. 3} A block diagram showing the internal configuration of a zero-level signal insertion unit shown in FIG. 1.

DESCRIPTION OF EXEMPLARY EMBODIMENTS

Hereinafter, an exemplary embodiment for carrying out the present invention will be described in detail with reference to the accompanying drawings.

Figure 1:
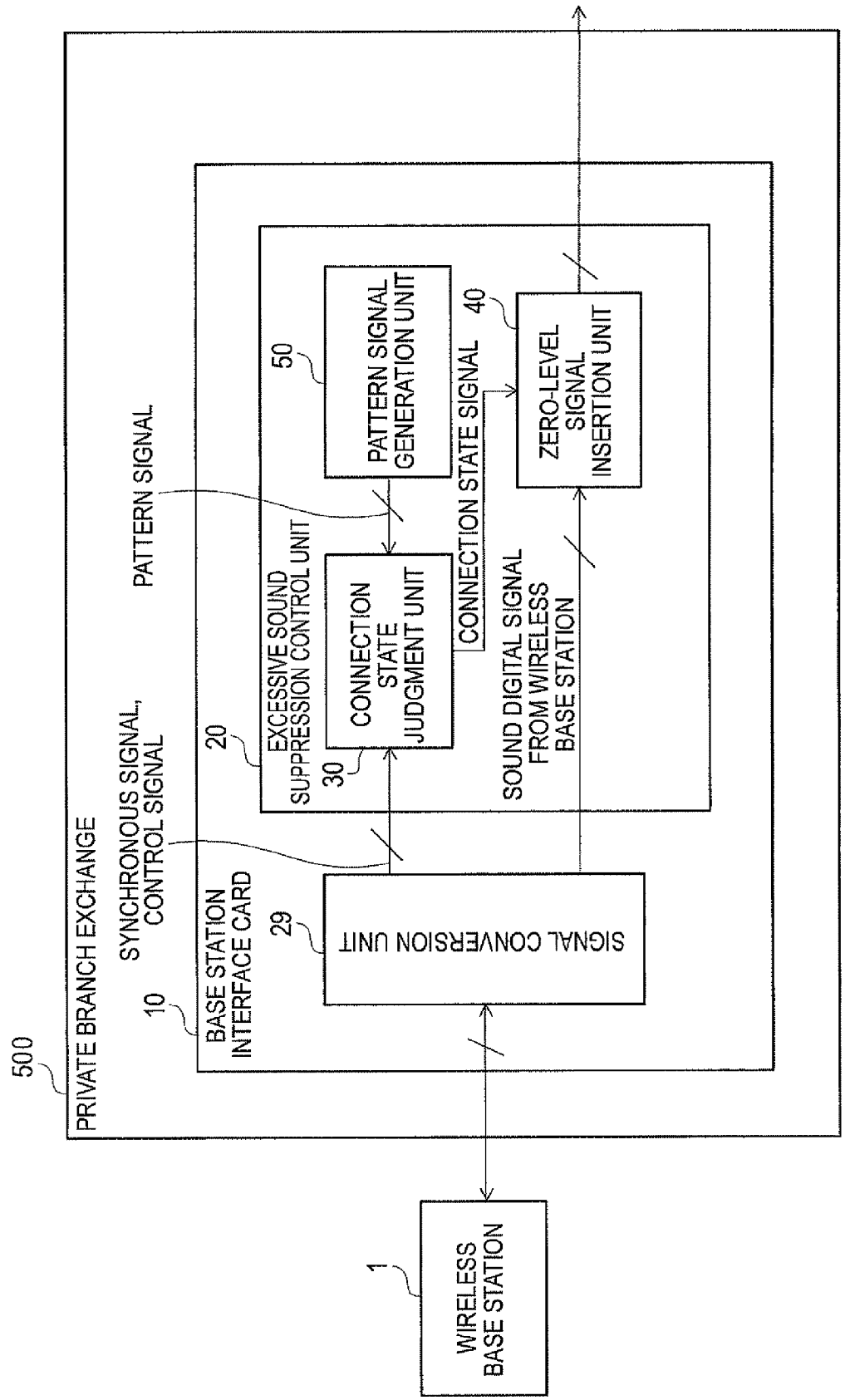
{FIG. 1} A block diagram showing a portion of a private branch exchange pertaining to the present invention and a wireless base station connected to the private branch exchange, according to an exemplary embodiment of the present invention.

With reference to FIG. 1, a private branch exchange 500 includes a base station interface card 10, which is connected to a wireless base station 1. The base station interface card 10 includes a signal conversion unit 29 and an excessive sound suppression control unit 20. The excessive sound suppression control unit 20 includes a connection state judgment unit 30, a zero-level signal insertion unit 40, and a pattern signal generation unit 50.

The wireless base station 1 communicates wirelessly with one or more mobile stations (not shown).

What is dealt with by the present exemplary embodiment is the case where a sound signal, which is generated based on the voice of a user of a mobile station, is output from a sound output unit of a telephone of an intended person (which is another mobile station that communicates wirelessly with the wireless base station 1, a mobile station that communicates wirelessly with a wireless base station other than the wireless base station 1, a fixed telephone, or the like). The following description focuses on the above case.

After being connected to the wireless base station 1, a mobile station converts the sound input from a user to a sound analog signal, and then converts the sound analog signal to a sound digital signal.

The mobile station follows a predetermined method to wirelessly transmit the sound digital signal to the wireless base station 1.

The wireless base station 1 follows a predetermined method to transmit the received sound digital signal to the signal conversion unit 29. The signal that is transmitted by the predetermined method is an AMI signal containing a sound digital signal and a control signal. Moreover, the signal that is transmitted by the predetermined method also contains a synchronization signal.

The signal conversion unit 29 separates the received AMI signal into the sound digital signal and the control signal. The signal conversion unit 29 outputs the synchronization signal and the control signal to the connection state judgment unit 30, and the received sound digital signal to the zero-level signal insertion unit 40.

The pattern signal generation unit 50 generates a reference synchronization signal that the connection state judgment unit 30 compares with a synchronization signal input from the signal conversion unit 29, and a reference control signal that the connection state judgment unit 30 compares with a control signal input from the signal conversion unit 29.

The connection state judgment unit 30 compares the synchronization signal input from the signal conversion unit 29 with the reference synchronization signal input from the pattern signal generation unit 50 in the two signals' portions that should be matched. Moreover, the connection state judgment unit 30 compares the control signal input from the signal conversion unit 29 with the reference control signal input from the pattern signal generation unit 50 in the two signals' portions that should be matched. In this case, the two signals' portions that should be matched are, for example, fixed-pattern portions. If the connection state judgment unit 30 detects, as a result of the above two types of comparison, that the two signals' portions have matched, then the connection state judgment unit 30 judges that the connection between the wireless base station 1 and the signal conversion unit 29 is normal. Meanwhile, if the connection state judgment unit 30 detects, as a result of at least one of the above two types of comparison, that the two signals' portions have not matched, then the connection state judgment unit 30 judges that the connection between the wireless base station 1 and the signal conversion unit 29 is abnormal. The connection state judgment unit 30 then outputs a connection state signal, which indicates whether the connection is normal or abnormal, to the zero-level signal insertion unit 40.

When the connection state signal indicates that the connection is normal, the zero-level signal insertion unit 40 just outputs the sound digital signal input from the signal conversion unit 29 into the private branch exchange. When the connection state signal indicates that the connection is abnormal, the zero-level signal insertion unit 40 outputs a zero-level signal generated inside the zero-level signal insertion unit 40 into the private branch exchange. According to the present exemplary embodiment, the zero-level signal is a sound digital signal representing silence.

Figure 2:
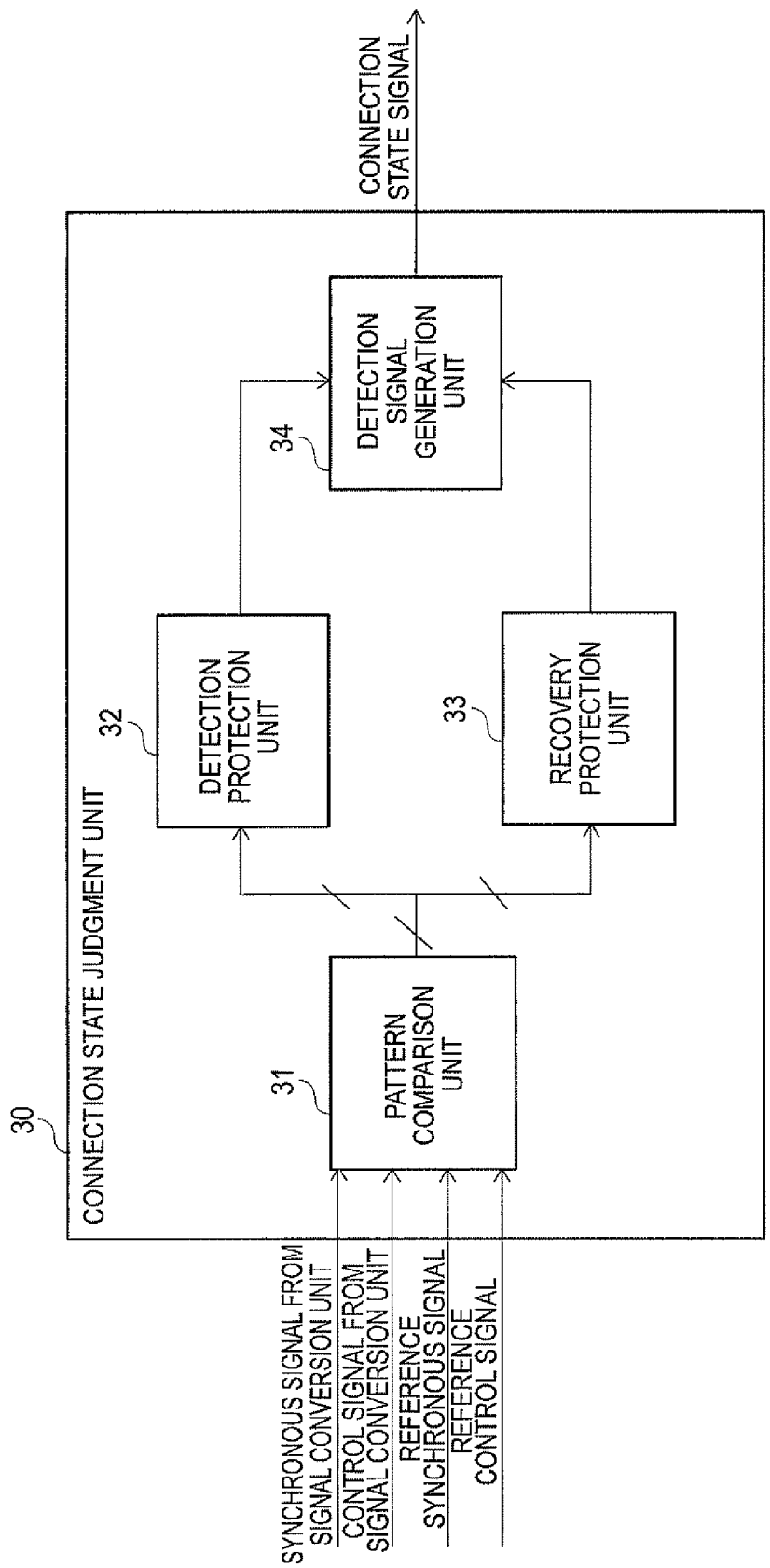
{FIG. 2} A block diagram showing the internal configuration of a connection state judgment unit shown in FIG. 1.

With reference to FIG. 2, the connection state judgment unit 30 includes a pattern comparison unit 31, a detection protection unit 32, a recovery protection unit 33, and a detection signal generation unit 34.

The pattern comparison unit 31 makes a first comparison, which is a comparison between a synchronization signal input from the signal conversion unit 29 and a reference synchronization signal input from the pattern signal generation unit 50 in the two signals' portions that should be matched; and a second comparison, which is a comparison between a control signal input from the signal conversion unit 29 and a reference pattern signal input from the pattern signal generation unit 50 in the two signals' portions that should be matched. Then, the pattern comparison unit 31 outputs a matching/mismatching signal to the detection protection unit 32 and the recovery protection unit 33: the matching/mismatching signal indicates "matching" when both the result of the first comparison and the result of the second comparison show that the two signals' portions have matched, and indicates "mismatching" when at least either the result of the first comparison or the result of the second comparison shows that the two signals' portions have not matched.

The detection protection unit 32 outputs a mismatching signal to the detection signal generation unit 34 if a predetermined number of frames whose matching/mismatching signal indicates "mismatching" have consecutively appeared. The number may be one; however, the operation becomes stabilized when the number is two or more.

The recovery protection unit 33 outputs a matching signal to the detection signal generation unit 34 if a predetermined number of frames whose matching/mismatching signal indicates "matching" have consecutively appeared. The number may be one; however, the operation becomes stabilized when the number is two or more. When the number is several, it is possible to prevent the excessive sound from occurring at the time of recovery.

When the mismatching signal is input from the detection protection unit 32, the detection signal generation unit 34 changes the value of the connection state signal so that the value indicates that the connection state is abnormal. When the matching signal is input from the recovery protection unit 33, the detection signal generation unit 34 changes the value of the connection state signal so that the value indicates that the connection state is normal.

With reference to FIG. 3, the zero-level signal insertion unit 40 includes a zero-level signal generation unit 41 and a sound selection unit 42. The zero-level signal generation unit 41 generates the above-described zero-level signal. The sound selection unit 42 just outputs a sound digital signal from the wireless base station 1 into the exchange at a time when the connection state signal indicates that the above connection is normal. The sound selection unit 42 outputs a zero-level signal input from the zero-level signal generation unit 41 into the exchange as a sound digital signal at a time when the connection state signal indicates that the above connection is abnormal.

The first advantageous effect of the present exemplary embodiment is as follows: even when a line connecting the wireless base station to the private branch exchange is disconnected or recovered, no excessive sound is sent out to the exchange. The reason is that the base station interface card includes the hardware-based excessive sound suppression control unit.

The second advantageous effect of the present exemplary embodiment is as follows: a special voltage monitoring circuit is unnecessary. Therefore, the costs of hardware can be reduced. The reason is that there is the excessive sound suppression control unit that uses the synchronization and control signals from the wireless base station as signals for detecting the disconnection of the line.

Incidentally, the present invention is not limited to the above exemplary embodiment. The present invention may also be applied to a device that is connected by wire from the private branch exchange that is unable to detect the line disconnection promptly; or to the case where a device with a large amount of delay to a terminal device is connected.

According to the above exemplary embodiment, the synchronization and control signals are used to detect the normality/abnormality of the connection. However, only the synchronization or control signal may be used to detect the normality/abnormality of the connection.

According to the above exemplary embodiment, sound signals are handled. Instead, video signals may be handled. In this case, a blue back signal or the like may be used as a zero-level signal.

According to the above exemplary embodiment, digital signals are handled. Instead, analog signals may be handled.

The whole or part of the exemplary embodiment disclosed above can be described as, but not limited to, the following supplementary notes.

(Supplementary Note 1)

An excessive signal prevention apparatus, including:

a connection state judgment section which detects whether connection between a first device and a second device is normal or abnormal on the basis of a pattern of one or more signals that are other than a transmission signal transmitted from the first device to the second device at normal time and are required for transmission of the transmission signal; and a zero-level signal insertion section which outputs the transmission signal output from the first device to a destination during a period of time when the connection state judgment section judges that the connection between the first device and the second device is normal, and which outputs a zero-level signal to the destination during a period of time when the connection state judgment section judges that the connection between the first device and the second device is abnormal.

(Supplementary Note 2)

The excessive signal prevention apparatus according to Supplementary Note 1, wherein if the pattern of at least one signal that is other than the transmission signal and is required for transmission of the transmission signal does not match a comparison pattern corresponding to the signal in portions that should be matched, the connection state judgment section judges that the connection between the first device and the second device is abnormal.

(Supplementary Note 3)

The excessive signal prevention apparatus according to Supplementary Note 1, wherein if a period of time during which the pattern of at least one signal that is other than the transmission signal and is required for transmission of the transmission signal does not match a comparison pattern corresponding to the signal in portions that should be matched exceeds a predetermined level, the connection state judgment section judges that the connection between the first device and the second device is abnormal.

(Supplementary Note 4)

The excessive signal prevention apparatus according to any one of (Supplementary Notes 1 to 3), wherein if the pattern of each signal that is other than the transmission signal and is required for transmission of the transmission signal matches a comparison pattern corresponding to the signal in portions that should be matched after the connection state judgment section judges that the connection between the first device and the second device is abnormal, then the connection state judgment section judges that the connection between the first device and the second device has returned to normal.

(Supplementary Note 5)

The excessive signal prevention apparatus according to any one of (Supplementary Notes 1 to 3), wherein if a period of time during which the pattern of each signal that is other than the transmission signal and is required for transmission of the transmission signal matches a comparison pattern corresponding to the signal in portions that should be matched exceeds a predetermined level after the connection state judgment section judges that the connection between the first device and the second device is abnormal, then the connection state judgment section judges that the connection between the first device and the second device has returned to normal.

(Supplementary Note 6)

The excessive signal prevention apparatus according to any one of (Supplementary Notes 1 to 5), wherein one or more signals that are other than the transmission signal and are required for transmission of the transmission signal include a synchronization signal or a control signal, or both.

(Supplementary Note 7)

An exchange, including the excessive signal prevention apparatus claimed in one of (Supplementary Notes 1 to 6).

(Supplementary Note 8)

An excessive signal prevention method, including:

a connection state judgment step of detecting whether connection between a first device and a second device is normal or abnormal, as well as whether an input sound signal is normal or abnormal, on the basis of a pattern of one or more signals that are other than a transmission signal transmitted from the first device to the second device at normal time and are required for transmission of the transmission signal; and a zero-level signal insertion step of outputting the transmission signal output from the first device to a destination during a period of time when the connection state judgment step judges that the connection between the first device and the second device is normal, and outputting a zero-level signal to the destination during a period of time when the connection state judgment step judges that the connection between the first device and the second device is abnormal.

(Supplementary Note 9)

The excessive signal prevention method according to Supplementary Note 8, wherein if the pattern of at least one signal that is other than the transmission signal and is required for transmission of the transmission signal does not match a comparison pattern corresponding to the signal in portions that should be matched, the connection state judgment step judges that the connection between the first device and the second device is abnormal.

(Supplementary Note 10)

The excessive signal prevention method according to Supplementary Note 8, wherein if a period of time during which the pattern of at least one signal that is other than the transmission signal and is required for transmission of the transmission signal does not match a comparison pattern corresponding to the signal in portions that should be matched exceeds a predetermined level, the connection state judgment step judges that the connection between the first device and the second device is abnormal.

(Supplementary Note 11)

The excessive signal prevention method according to any one of (Supplementary Notes 8 to 10), wherein if the pattern of each signal that is other than the transmission signal and is required for transmission of the transmission signal matches a comparison pattern corresponding to the signal in portions that should be matched after the connection state judgment step judges that the connection between the first device and the second device is abnormal, then the connection state judgment step judges that the connection between the first device and the second device has returned to normal.

(Supplementary Note 12)

The excessive signal prevention method according to any one of (Supplementary Notes 8 to 10), wherein if a period of time during which the pattern of each signal that is other than the transmission signal and is required for transmission of the transmission signal matches a comparison pattern corresponding to the signal in portions that should be matched exceeds a predetermined level after the connection state judgment step judges that the connection between the first device and the second device is abnormal, then the connection state judgment step judges that the connection between the first device and the second device has returned to normal.

(Supplementary Note 13)

The excessive signal prevention method according to any one of (Supplementary Notes 8 to 12), wherein one or more signals that are other than the transmission signal and are required for transmission of the transmission signal include synchronization signal or a control signal, or both.

The present application is based on Japanese Patent Application No. 2010-120323 (filed on May 26, 2010), and claims priority under the Paris Convention from Japanese Patent Application No. 2010-120323, the entire contents of which are incorporated herein by reference.

Although the exemplary embodiment of the present invention has been described in detail, it is to be understood that various changes, substitutions and alternatives may be made without departing from the spirit and scope of the invention as defined in the appended claims. Even if the claims are amended in a filing process, the inventor intends the range of equivalency of the claims of the invention to be maintained.

INDUSTRIAL APPLICABILITY

The present invention can be applied for the case where the disconnection and recovery of a line take place between devices connected by wire, and the case where communication data need to be determined immediately.

REFERENCE SIGNS LIST

1: Wireless base station
10: Base station interface card
20: Excessive sound suppression control unit 30: Connection state judgment unit
31: Pattern comparison unit
32: Detection protection unit
33: Recovery protection unit
34: Detection signal generation unit
40: Zero-level signal insertion unit
41: Zero-level signal generation unit
42: Sound selection unit
50: Pattern signal generation unit

The invention claimed is:

1. An excessive signal prevention apparatus, comprising:
a connection state judgment section which detects whether connection between a first device and a second device is normal or abnormal on the basis of a pattern of one or more signals that are other than a transmission signal transmitted from the first device to the second device at normal time and are required for transmission of the transmission signal; and
a zero-level signal insertion section which outputs the transmission signal output from the first device to a destination during a period of time when the connection state judgment section judges that the connection between the first device and the second device is normal, and which outputs a zero-level signal to the destination during a period of time when the connection state judgment section judges that the connection between the first device and the second device is abnormal.

2. The excessive signal prevention apparatus according to claim 1, wherein, if the pattern of at least one signal that is other than the transmission signal and is required for transmission of the transmission signal does not match a comparison pattern corresponding to the signal in portions that should be matched, the connection state judgment section judges that the connection between the first device and the second device is abnormal.

3. The excessive signal prevention apparatus according to claim 1, wherein, if a period of time during which the pattern of at least one signal that is other than the transmission signal and is required for transmission of the transmission signal does not match a comparison pattern corresponding to the signal in portions that should be matched exceeds a predetermined level, the connection state judgment section judges that the connection between the first device and the second device is abnormal.

4. The excessive signal prevention apparatus according to claim 1, wherein, if the pattern of each signal that is other than the transmission signal and is required for transmission of the transmission signal matches a comparison pattern corresponding to the signal in portions that should be matched after the connection state judgment section judges that the connection between the first device and the second device is abnormal, then the connection state judgment section judges that the connection between the first device and the second device has returned to normal.

5. The excessive signal prevention apparatus according to claim 1, wherein, if a period of time during which the pattern of each signal that is other than the transmission signal and is required for transmission of the transmission signal matches a comparison pattern corresponding to the signal in portions that should be matched exceeds a predetermined level after the connection state judgment section judges that the connection between the first device and the second device is abnormal, then the connection state judgment section judges that the connection between the first device and the second device has returned to normal.

6. The excessive signal prevention apparatus according to claim 1, wherein one or more signals that are other than the transmission signal and are required for transmission of the transmission signal include a synchronization signal or a control signal, or both.

7. An exchange, comprising
the excessive signal prevention apparatus claimed in claim 1.

8. An excessive signal prevention method, comprising:
a connection state judgment step of detecting whether connection between a first device and a second device is normal or abnormal, as well as whether an input sound signal is normal or abnormal, on the basis of a pattern of one or more signals that are other than a transmission signal transmitted from the first device to the second device at normal time and are required for transmission of the transmission signal; and
a zero-level signal insertion step of outputting the transmission signal output from the first device to a destination during a period of time when the connection state judgment step judges that the connection between the first device and the second device is normal, and outputting a zero-level signal to the destination during a period of time when the connection state judgment step judges that the connection between the first device and the second device is abnormal.

* * * * *